Dec. 7, 1954     E. H. JOHNSON ET AL     2,696,386

CHUCK

Filed Feb. 5, 1953

*INVENTOR.*
ERNEST H. JOHNSON
JOSEPH C. LA MASTRA
BY

United States Patent Office 2,696,386
Patented Dec. 7, 1954

2,696,386

CHUCK

Ernest H. Johnson, Bridgeport, and Joseph C. La Mastra, Stratford, Conn., assignors to The Bullard Company, a corporation of Connecticut Application February 5, 1953, Serial No. 335,248

7 Claims. (Cl. 279—119)

The present invention relates to machine tools and particularly, to a new and improved chucking mechanism for lathes and the like.

The gripping of thin-walled workpieces in chucks during turning operations has always presented a serious problem, particularly where tolerances are at all critical. In the past thin-walled workpieces have usually been held in three- and four-jaw chucks, either by an external contracting action or an internal expanding action. Such chuck actuation causes distortion of the thin-walled workpiece to such an extent that although accurate turning of the workpiece could be effected, release of the workpiece from the chuck would cause distortion of the workpiece to such an extent that it was impossible to maintain the required tolerances in many instances. Various modifications of the chuck jaw surfaces including the increasing of the area of contact between the jaw surfaces and the workpiece have, in some instances, lessened the condition of distortion, however, all of the known prior art modifications to overcome this difficulty have not satisfactorily solved the problem.

The principal object of the present invention is to provide a chuck construction that will rigidly grip a thin-walled workpiece and maintain it in an undistorted condition throughout a working operation thereon.

Other objects include the provision of a chuck mechanism in which localized opposed internal and external gripping of the thin-walled workpiece is effected; the provision of such a chucking mechanism in which the opposed localized gripping action is occasioned by relatively movable, aligned chucking jaws; the provision of such a chucking mechanism in which the top jaw gripping portion of which is composed of widely spaced groups of a few teeth each in which the teeth on the internal and external top jaws are in substantially exact alignment in parallel planes passing axially through said work; the provision of such a chucking mechanism in which the external and internal top jaws act to maintain the thin-walled workpiece in abutting relation with a plurality of equally spaced supporting buttons in the chucking construction; the provision of such a chucking mechanism in which a diametrically opposed floating chuck jaw construction is employed in combination with the previously-described top jaw gripping elements; and the provision of such a chucking mechanism in which one of the opposed chucking jaws is swivelly mounted to permit proper alignment with its opposed jaw during a gripping action.

The above, other objects and novel features of the invention will become apparent from a consideration of the following specification considered in the light of the accompanying drawings, in which.

Figures 1, 2, 3, 4:
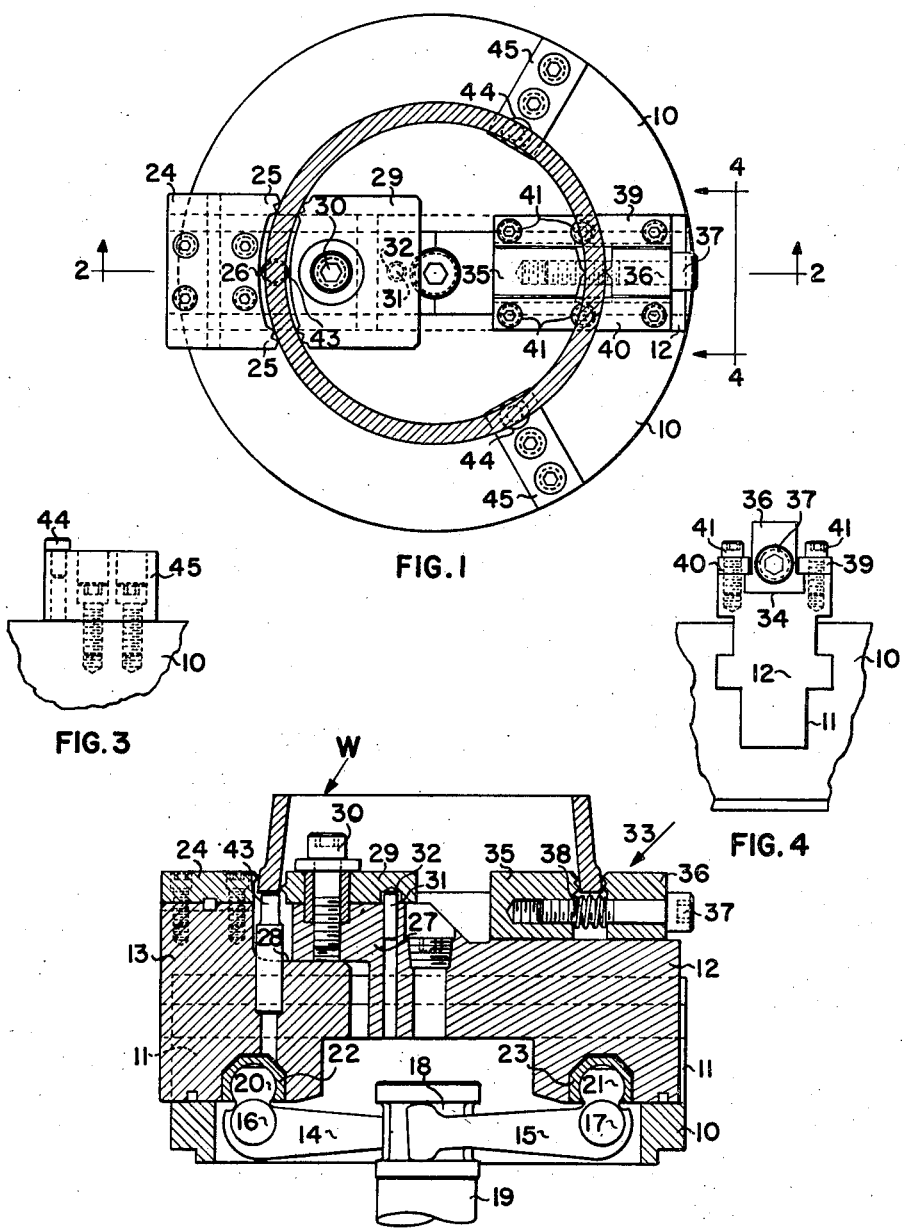
Figure 1 is a top plan view of a two-jaw chuck to which the principles of the present invention have been applied.
Fig. 2 is a sectional elevational view taken substantially along line 2—2 of Fig. 1, with the gripping teeth of the jaw shown in a displaced condition for clarity.
Fig. 3 is a partial elevational view of a portion of the structure shown in Fig. 1.
Fig. 4 is an end elevational view along line 4—4 of Fig. 1.

Referring to the drawing, and particularly to Fig. 2, the invention is shown as applied to a two-jaw chuck including a base member 10 having diametrically opposed ways 11 within which bottom jaws 12 and 13 are adapted to be reciprocated. The base 10 is relieved centrally thereof for the reception of bell crank levers 14 and 15 that are trunnioned in the base 10 by the trunnions 16 and 17. The ends of the long arms 14 and 15 opposite those connected to the trunnions 16 and 17 fit within a groove 18 of a draw bar 19. The shorter arms of the bell cranks 14 and 15 are in the form of spherical ball members 20 and 21 which seat within mating bearings 22, 23 fixed to the bottom jaws 13 and 12, respectively. Vertical reciprocation of the draw bar 19 obviously causes the bottom jaws 12 and 13 to move toward and from each other along a diameter of the chuck body 10.

The bottom jaw 13 is provided with a top jaw 24 rigidly fixed thereto and, as shown in Fig. 1, it is provided with a plurality of groups of gripping teeth 25, which, in the embodiment shown, comprise two gripping teeth in each group. The two groups of gripping teeth are widely separated by a relieved portion 26. The bottom jaw 12 is of a construction which includes a portion 27 that extends over and rests on a surface 28 of the bottom jaw 13. A top jaw 29 is pivotally mounted on the extension 27 by a bolt 30 threaded into the extension 27. A dowel pin 31 mounted within the extension 27 extends into a recess 32 provided in the under surface of the top jaw 29 to limit the pivotal movement thereof.

The bottom jaw 12 is also provided with a freely floating internal-external chuck jaw construction 33 that is adapted to be reciprocated within a way 34 (Fig. 4) formed in the bottom jaw 12. Chuck jaw construction 33 includes internal and external gripping elements 35 and 36. A connecting bolt 37 extends through the element 36 and threadingly engages the element 35, and a compression spring 38 is located between the two elements 35 and 36 and surrounds the bolt 37. The elements 35 and 36 are retained in the way 34 by removable flanges 39 and 40 that are fixed to the bottom jaw 12 by bolts 41.

A work-supporting stud 43 is mounted within the bottom jaw 13. Two additional work-supporting studs 44 are mounted in blocks 45 which latter are bolted to the main body portion 10. Referring to Fig. 3, the construction of the blocks 45 and the work-supporting pins 44 is clearly disclosed.

Referring to Fig. 2, the operation of the chucking mechanism is as follows: A workpiece W having a relatively thin-walled construction is seated upon the work-supporting studs 43 and 44. Vertically downward movement of the draw bar 19 causes the gripping jaws 24 and 29 to engage internal and external surfaces of the thin-walled construction of the workpiece W at the same peripheral locations. Inasmuch as the engaging teeth of the gripping element 24 are at a higher elevation than those of the element 29, the workpiece W is pivoted about the work-supporting stud 43 so that it is forced into engagement with the work-supporting studs 44. Furthermore, inasmuch as the teeth of the internal and external gripping elements 24 and 29 (Fig. 1) are in exact alignment, or lie in substantially parallel planes, passing axially through the workpiece W, there is no tendency to distort the thin wall of the workpiece W. Finally, the floating chuck elements 35 and 36 are brought into engagement with the thin-walled workpiece diametrically opposite the location where the elements 24 and 29 engage it. The elements 35 and 36 are tightened into gripping engagement with the thin-walled workpiece W by the bolt 37.

Although the various features of the improved chucking mechanism have been shown and described in detail to fully disclose one embodiment of the invention, it will be evident that numerous changes may be made in such details and certain features may be used without others, without departing from the principles of the invention.

What is claimed is:

1. In a chuck, a base; bottom jaws adapted to be reciprocated toward and from each other; and top jaws on said bottom jaws having sets of spaced internal and external gripping teeth separated solely by the work thickness, said internal and external teeth being aligned in axially extending parallel planes passing through said work, and non-aligned in spaced parallel planes passing transversely through said work.

2. In a chuck, a base; radially-disposed relatively reciprocable bottom jaws mounted in said base; work locating means mounted in said chuck; and top jaws on said bottom jaws having sets of spaced internal and external gripping teeth separated solely by the work thickness, said internal and external teeth being aligned in axially extending parallel planes passing through said work, and non-aligned in spaced parallel planes passing transversely through said work, whereby, upon rendering said gripping means effective, said workpiece is urged into engagement with said locating means.

3. In a chuck, a rotatable base; bottom jaws adapted to be reciprocated toward and from each other mounted on said base; top jaws attached to said bottom jaws and adapted simultaneously to engage the internal and external walls of a thin-walled workpiece at the same peripheral location thereof; internal and external gripping jaws independent of said first-mentioned gripping jaws adapted to grip said work internally and externally at a peripheral location diametrically opposed to that of said first-mentioned gripping jaws; and means for reciprocating said bottom jaws.

4. In a chuck, a base; bottom jaws adapted to be reciprocated toward and from each other mounted on said base; means on said bottom jaws adapted simultaneously to engage inner and outer walls of a thin-walled workpiece at the same peripheral location of said workpiece; means separate from said first-mentioned means adapted simultaneously to engage inner and outer walls of said thin-walled workpiece at the same peripheral location of said workpiece but diametrically opposed to the peripheral location of said first-mentioned means, all of said means including aligned teeth, whereby said thin-walled workpiece will not be distorted during a machining operation; and means for reciprocating said bottom jaws toward and from each other.

5. In a chuck, a base; bottom jaws adapted to be reciprocated toward and from each other; top jaws on said bottom jaws having sets of spaced internal and external gripping teeth separated solely by the work thickness, said internal and external teeth being aligned in axially extending parallel planes passing through said work, and non-aligned in spaced parallel planes passing transversely through said work; additional top jaws on one of said bottom jaws, independent of said first-mentioned top jaws, and having aligned teeth adapted to grip said workpiece internally and externally at the same peripheral location but diametrically opposed to the location at which said first-mentioned top jaws grip said work; and means for reciprocating said bottom jaws.

6. In a chuck, a base; two relatively-reciprocable bottom jaws mounted on said base; a rigidly mounted top jaw fixed to one of said bottom jaws and provided with gripping teeth; another top jaw having gripping teeth, said other top jaw being pivotally mounted on the other of said bottom jaws, the construction and arrangement of the parts being such that said top jaws grip said work externally and internally simultaneously at the same peripheral location on said workpiece and separated solely by the thickness of said work; additional top jaws mounted on one of said bottom jaws and adapted to grip said workpiece internally and externally simultaneously at the same peripheral location but diametrically opposed to that engaged by said first-mentioned top jaws; and means adapted to reciprocate said bottom jaws.

7. In a chuck, a base; bottom jaws adapted reciprocably to be mounted on said base; top jaws mounted on said bottom jaws in position to simultaneously grip the external and internal surface of said workpiece at the same peripheral location on said workpiece; additional top jaws on one of said bottom jaws, independent of said first-mentioned top jaws and adapted to grip said workpiece internally and externally simultaneously at a peripheral location diametrically opposed to that engaged by said first-mentioned top jaws; and means adapted to reciprocate said bottom jaws.

References Cited in the file of this patent

UNITED STATES PATENTS

| Number | Name | Date |
|--------|------|------|
| 566,702 | Sellers | Aug. 25, 1896 |